United States Patent [19]

Nakamaru et al.

[11] Patent Number: 6,013,389
[45] Date of Patent: Jan. 11, 2000

[54] CYLINDRICAL STORAGE BATTERY

[75] Inventors: Hisao Nakamaru, Kamakura; Norio Suzuki; Toshihide Eguchi, both of Chigasaki; Masato Onishi, Fujisawa, all of Japan

[73] Assignee: Matsushita Electric Industrial Co., Ltd., Osaka, Japan

[21] Appl. No.: 09/050,984

[22] Filed: Mar. 31, 1998

[30] Foreign Application Priority Data

Dec. 5, 1997 [JP] Japan .................................. 9-335354

[51] Int. Cl.$^7$ .......................... H01M 2/26; H01M 10/16; H01M 2/28
[52] U.S. Cl. ........................ 429/161; 429/94; 429/208; 429/246
[58] Field of Search .............................. 429/94, 161, 208, 429/246

[56] References Cited

U.S. PATENT DOCUMENTS

| | | |
|---|---|---|
| 3,650,842 | 3/1972 | Bougaran . |
| 3,732,124 | 5/1973 | Cailley . |
| 4,009,053 | 2/1977 | Schenk et al. . |
| 4,053,687 | 10/1977 | Coibion et al. ............................ 429/94 |
| 4,332,867 | 6/1982 | Tsuda et al. ............................ 429/94 |
| 4,554,227 | 11/1985 | Takagaki et al. . |
| 4,767,682 | 8/1988 | Dorogi et al. ............................ 429/94 |
| 4,963,446 | 10/1990 | Roels et al. ............................ 429/94 |
| 5,043,235 | 8/1991 | Seefeldt et al. ............................ 429/94 |
| 5,238,757 | 8/1993 | Suzuki et al. . |

FOREIGN PATENT DOCUMENTS

| | | |
|---|---|---|
| 0878855 | 11/1998 | European Pat. Off. . |
| 2260878 | 9/1975 | France . |
| 3019186 | 11/1981 | Germany . |

OTHER PUBLICATIONS

European Search Report dated Mar. 22, 1999.
Patent Abstracts of Japan, vol. 10, No. 145, May 28, 1986, JP 61–008844A (Nihon Denchi KK), Jan. 16, 1986.

*Primary Examiner*—Maria Nuzzolillo
*Assistant Examiner*—Tracy Dove
*Attorney, Agent, or Firm*—Stevens, Davis, Miller & Mosher, L.L.P.

[57] ABSTRACT

An improvement is provided in the shape of current collectors welded to the respective terminal edges of electrode plates projecting from the upper and the lower end plane of a spirally coiled electrode plate assembly incorporated in a cylindrical storage battery. In the preferred embodiment, the current collector formed essentially of a rectangular flat plate is provided with an I-shaped cutout hole which passes the center of the plate and ends inside the plate near to its outer peripheral edge and two of rectangular cutout parts which are approximately at a right angle to the I-shaped hole and extend from the neighborhood of the center of the plate to its outer peripheral part without intersecting the I-shaped hole, downward rib-formed projections being respectively formed integrally at the edge parts of the cutout hole and the respective cutout parts, the respective rib-formed projections crossing the terminal edges of the electrode plate and being welded to the terminal edges at a plurality of spots. Particularly, the rib-formed projection of the I-shaped cutout hole crosses also the electrode plate coiling start terminal part of the electrode plate assembly and hence can secure welding spots over a wide region in the diameter direction of the electrode plate assembly and thus permits high rate charge and discharge.

8 Claims, 3 Drawing Sheets

CYLINDRICAL STORAGE BATTERY

BACKGROUND OF THE INVENTION

1. Field of the Invention

The present invention relates to a cylindrical storage battery provided with a spirally coiled electrode plate assembly. More particular, it relates to an alkaline storage battery which is suitable for, for example, the driving power source of vehicles. The battery is improved in the shape of the current collectors welded to the upper and lower parts of the electrode plate assembly to secure the welding of the spiral coiling start part of the electrode plate assembly with the current collector and thereby to permit high-rate charge and discharge through the current collectors.

2. Related Art

Various types of cylindrical alkaline storage batteries are known, representatives of which include nickel-cadmium storage batteries and nickel-metal hydride storage batteries. These batteries are in wide use for various equipment, such as portable telephones and notebook-sized personal computers, because of their high reliability and easy maintenance. In recent years, the development of cylindrical storage batteries suited to high-rate discharge are eagerly awaited as the power source for motor power assist bicycles, lawn mowers and further electric automobiles and the like.

Such a cylindrical storage battery for high-rate discharge has an electrode plate assembly comprising one strip-shaped positive electrode plate and one strip-shaped negative electrode plate which are wound as spiral coils with a separator interposed therebetween, and the assembly is housed in a battery case made of metal. As to the structure for collecting the output and input currents from or to the electrode plates suited to a large electric current, a type in which respectively one rectangular or nearly circular plate-formed current collector is welded at a plurality of spots to the terminal edge of respective one-side electrode plate projecting outward respectively from the upper and lower end planes of the electrode plate assembly (this type being hereinafter referred to as tabless type) is disclosed, for example, in U.S. Pat. Nos. 3,732,124 and 5,238,757, and is in general use at present.

Various types have been proposed for such current collectors welded to the terminal part of the electrode plate assembly, a representative one of which is the current collector 14 shown in FIG. 7.

This current collector is provided with a rectangular flat plate part 14a, rib-formed projections 14b formed by bending vertically downward the two side edges stretching along the length direction of the plate part 14a, and two U-shaped cutout parts 14c or punched holes. The welding of the current collector 14 to the electrode plate assembly is effected through electric resistance welding by making the rib-formed projections 14b cross the terminal edge of one side electrode projecting upward from the electrode plate assembly, pressing a pair of bar-formed welding electrodes-against the upper side of the flat plate parts 14d of the current collector 14 which hold the cutout part 14c therebetween or against the upper side of the projection 14b, and passing electricity between the electrodes under application of pressure.

In the above-mentioned current collector 14, however, the rib-formed projection 14b is formed in the direction parallel to both side edges which extend along the length direction of the plate part 14a. Accordingly, even when welding is conducted by pressing a pair of welding electrodes against the plate part 14a located at the positions which hold the cutout part 14c therebetween and passing electricity under applied pressure, the electric current which flows on the plate part 14a between the pair of welding electrodes (namely, loss current in welding) is large owing to adverse conditions of the distance of electricity passage and the electric resistance on the contrary, the electric current which flows through the crossing part of the pair of projections 14b and the electrode terminal edge is small, so that it is difficult to melt the crossing part of the projection 14b and the electrode terminal edge sufficiently to secure good welding.

Resultantly, the weld part, namely the integrated part formed by the rib-formed projection 14b and the electrode terminal edge, has a high contact resistance and, when the battery is discharged with a large electric current, for example, 3c (electric current of three times the battery capacity), the IR (voltage) drop at the weld part is too large (resulting in loss of electricity) to give a satisfactory battery performance.

SUMMARY OF THE INVENTION

The main object of the present invention is to provide, a storage battery which overcomes the above-mentioned difficulties and, which permits charge and discharge at high rates through the current collector by improving the shape of the current collector welded to the end part of the spirally coiled electrode plate assembly to concentrate the welding current at the crossing part of the rib-formed projection provided to the current collector and the projecting terminal edge of the electrode and thereby to melt the crossing part sufficiently to effect firm welding.

According to the present invention, there is provided a cylindrical storage battery comprising a spirally coiled electrode plate assembly consisting essentially of a positive electrode plate, a negative electrode plate and a separator each in the shape of strip, and respectively one current collector formed essentially of a rectangular or nearly circular plate which collector is welded respectively to the terminal edge of either the positive electrode or the negative electrode respectively projecting outward from the upper and lower end planes of the electrode plate assembly, at least the current collector welded to the upper part of the electrode plate assembly being provided with a cutout hole which passes the center of the plate and ends inside the plate near its outer peripheral edge, and a plurality of cutout parts which extend from the neighborhood of the center of the plate to the outer peripheral edge of the plate without intersecting the hole, rib-formed projections being integrally formed downward at the edge parts of the cutout hole and the respective cutout parts, the (tip of the) rib-formed projections being welded to the terminal edge of one side electrode plate while the pieces are crossing the terminal edge and partly biting thereinto.

DESCRIPTION OF THE PREFERRED EMBODIMENT

Figure 1:
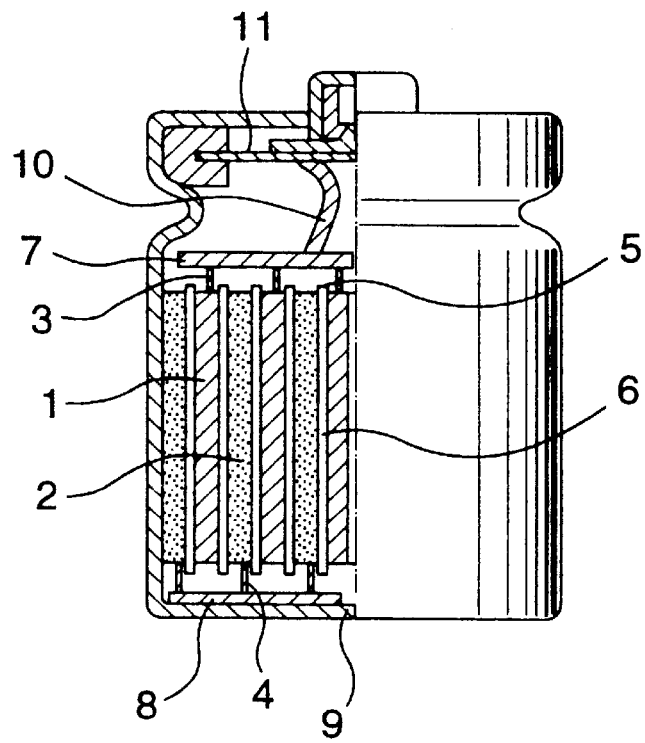
FIG. 1 is a partially sectional side view of a nickel-cadmium storage battery shown in a first Example of the present invention.

The shapes of the cutout hole and the cutout parts of the current collector are very important in welding the current collector securely and firmly to the electrode plate terminal edge projecting outward from the electrode plate assembly.

Thus, if a pair of electrodes for electric resistance welding are merely held against the flat plate part, devoid of any cutout part, of a current collector, the loss current, which flows through the surface of the flat plate part between the electrodes and does not contribute to welding, increases, making it difficult to weld securely the rib-formed projection of the current collector to the electrode terminal edge at a plurality of spots.

In the present invention, the current collector preferably made of nickel plate steel is provided with one cutout hole which passes the center of the plate and ends inside the plate near its outer peripheral edge, and a plurality of cutout parts which extend from the neighborhood of the center of the plate until they open at the outer peripheral part of the plate without intersecting the cutout hole, downward rib-formed projections being respectively formed integrally at the edge parts of the cutout hole and the cutout parts.

Accordingly, the rib-formed projection and the terminal edge of the electrode plate projecting outward from the end part of the electrode plate assembly cross each other; therefore, by pressing a pair of welding electrodes against the flat plate part of the current collector so as to hold the cutout hole therebetween and to hold the cutout parts therebetween, the loss current which flows through the plate part surface of the current collector between the pair of electrodes decreases by virtue of the cutout hole and cutout parts, and the effective welding current which flows into the crossing part of the projection located on the underside of the cutout hole and cutout parts and the terminal edge of the electrode plate is increased, whereby welding is effected securely at a number of crossing parts. In particular, the projection provided at the cutout hole can ensure welding spots over a wide region including the central part of the electrode plate assembly in the diameter direction of the assembly, because the projection crosses also the electrode plate spiral coiling start terminal edge which is near to the center of the electrode plate assembly.

The shape of the cutout parts is not limited, for example a rectangular cutout part, an elliptic cutout part and a trapezoidal cutout part are exemplified. For the convenience of manufacturing the rib-formed projections, a rectangular cutout part is preferable. Cutout parts are preferably formed with equal intervals taking the cutout hole into consideration. The number of cutout parts is preferably 2~6, more preferably 2~4, most preferably 2. The rib-formed projections may be formed only at the two opposed edge parts of each of the cutout parts. The shape of the cutout hole is also not limited, however an I-shaped hole is preferable. The I-shaped hole may have a circular arc at the central part in order to pass through a welding electrode. The rib-formed projections may be formed only at the two longer opposed edge parts of the cutout hole.

The height (width) and the thickness of the rib-formed projection which is to cross the terminal edge of the electrode plate also are important for securing the above-mentioned crossing part and concentrating the welding current. In the present invention, the projection height of the rib-formed projection should be smaller than the width of the perforation sheet bare part which constitutes the projecting terminal edge of the electrode plate; preferably the projection height from the plate part is ⅕ to ⅔ of the width of the perforation sheet bare part so that the projection may not touch the terminal edge of the opposite electrode even at the completion of welding. The thickness of the projection is preferably 2–8 times the thickness of the perforation sheet so that the tip of the projection may be held securely against the end surface of the perforation sheet bare part of electrode plate and the crossing parts may generate heat uniformly by resistance and may be uniformly molten and deformed.

An aspect of the present invention specifies the shape and the state of welding of the cutout parts of current collectors for a positive and a negative electrode which are welded to the terminal edges of electrode plates respectively projecting outward from the upper and the lower end of a spirally coiled electrode plate assembly. The respective current collectors for the positive and the negative electrode cross the coiling start part of the electrode plate assembly and are securely welded at a number of spots to the electrode plate terminal edges over a wide region in the diameter direction of the assembly, whereby an excellent current collecting structure which permits high-rate charge and discharge is provided.

Other aspects of the present invention specify the specific size and shape of the rib-formed projection formed at the cutout part of the current collector and the relation of the size of the projection to the size of the perforation sheet bare part of the electrode plate terminal edge to be welded thereto, to secure sufficiently weld parts suited to high-rate discharge.

Further aspects of the present invention disclose a preferred specific battery structure which permits high-rate charge and discharge through current collectors wherein strip-shaped electrode plates constituting a spirally coiled electrode plate assembly form, over nearly the whole length in the length direction thereof, a number of welding parts with the current collectors.

EXAMPLES

Some specific examples of the present invention are described below with reference to the accompanying drawings.

FIG. 1 is a partially sectional side view of a nickel-cadmium storage battery A having a current collecting structure of tabless type shown in the first Example of the present invention. The battery A has a diameter of 33 mm, a height of 61.5 mm and a nominal capacity of 5,000 mAh. The structure of the battery A is described in detail below.

A sintered type nickel positive electrode plate 1 1.0 mm in thickness and a strip-shaped paste type cadmium negative electrode plate 2 0.7 mm in thickness were prepared. The respective electrode plates were provided at their lengthwise terminal edges with bare perforation sheet parts 3 and 4 each in a width of 1.5 mm. A nickel-plated iron plate about 0.08 mm in thickness was used as the perforation sheet 3 of the positive electrode and a nickel-plated iron plate about 0.06 mm in thickness was used as the perforation sheet 4 of the negative electrode plate, respectively, in consideration of the easiness of bending in coiling spirally the electrode plates and the secureness in welding. A separator 6 was interposed between the electrode plates such that the bare perforation sheet parts 3 and 4 respectively project by about 1.5 mm above and below an electrode plate assembly 5, and the whole was wound spirally to form an electrode plate assembly 5 about 30 mm in diameter and about 50 mm in height.

A rectangular positive electrode current collector 7 having a diagonal length of about 27 mm provided with an I-shaped cutout hole 7b about 5 mm in width which crosses the center of spiral coiling of the electrode plate assembly was arranged right above the upper end plane of the above-mentioned electrode plate assembly 5. At the lower end plane of the electrode plate assembly 5, also, a rectangular negative electrode current collector 8 as shown in FIG. 2B having the same diagonal length as above provided with an I-shaped cutout hole 8b of the same width as mentioned above and, at the central part thereof, with a connecting tongue-shaped lead 8e formed integrally with the flat plate part was contacted with the bare perforation sheet part 4. Then, the current collectors 7 and 8 were respectively welded to the bare perforation sheet parts 3 and 4 at a plurality of spots by using a pair of welding electrodes. The details of welding are described later. The electrode plate assembly 5 was inserted into a metal case 9, one welding electrode was passed through the central hole of the current collector 7 and through a hole remaining at the center of the plate assembly after removal of the core used in winding so as to press, with the tip of the electrode, the connecting tongue-shaped lead provided at the central part of the current collector 8, and the pressed part was welded to the inner bottom surface of the battery case.

Then a predetermined amount of an alkaline electrolyte was poured into the battery case 9 by making use of the hole and the cutout parts of the positive electrode side current collector 7, one end of a connecting lead 10 welded at the other end to the current collector 7 is welded to the lower surface of a sealing plate 11 which doubles as the positive electrode terminal, and the opening of the case 9 was hermetically sealed with the sealing plate 11. Thus, the battery A of the present invention was obtained.

Figure 2A:
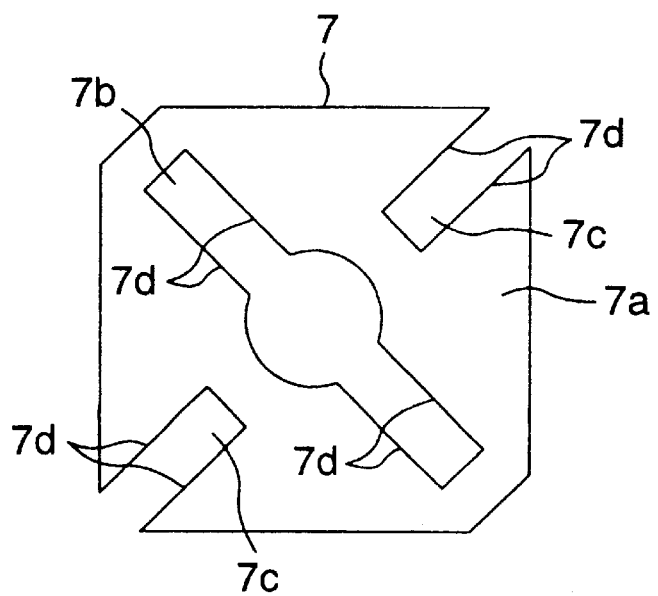
FIG. 2A is a top view of the current collector which is welded to the upper part of the electrode plate assembly.
Figure 2B:
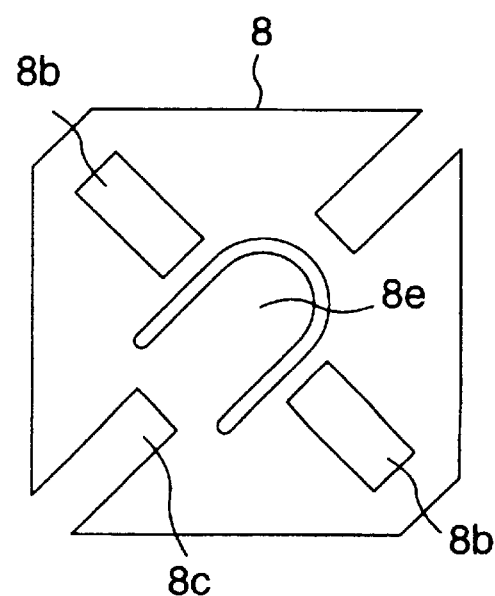
FIG. 2B is a top view of the current collector which is welded to the lower part of the electrode plate assembly.

As shown in FIG. 2A, the rectangular positive electrode current collector 7 welded to the upper end plane of the electrode plate assembly 5 is provided with an I-shaped cutout hole 7b which passes the central part of a flat plate part 7a 0.5 mm in thickness and ends inside the plate near its outer peripheral edge and with two rectangular cutout parts 7c which are approximately at a right angle to the I-shaped hole and extend from the neighborhood of the center of the plate to its outer peripheral edge without intersecting the I-shaped hole. The central part of the I-shaped cutout hole 7b is in the form of circular arc with a larger opening than other parts to facilitate the above-mentioned passing through of the welding electrode.

Figure 3:
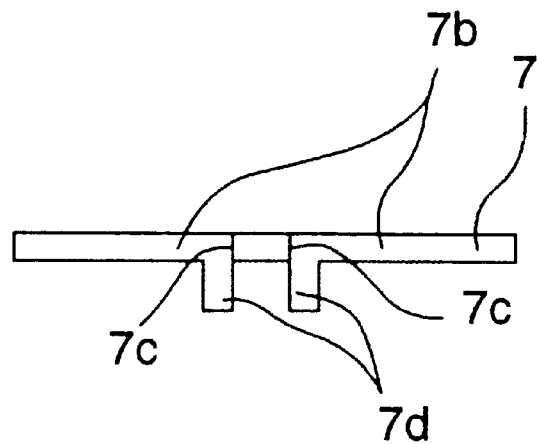
FIG. 3 is a front view of the current collector of the above-mentioned battery.

The cutout hole and the cutout parts are respectively provided at their edge parts 7d, as shown in FIG. 3, with integrally formed, downward rib-formed projections 7e having a projecting height (length) of 0.5 mm and a thickness of 0.3 mm. The projection 7e and the bare perforation sheet part of the electrode plate terminal part are welded by holding a pair of welding electrodes having a rectangular tip against the flat plate part 7a along the edge part 7d so as to hold the cutout hole 7b or the rectangular cutout part 7c therebetween, and passing an alternate current of about 2,000A between the pair of electrodes for about 10 $\mu$sec while pressing the welding electrodes against the plate part 7a.

In this way, the welding current which flows through the flat surface of the current collector 7 between the pair of welding electrodes decreases as the result of obstruction by the rectangular cutout hole 7b or the cutout parts 7c and increase in distance which the current flows. On the other hand, the distance between the welding electrode through the bare perforation sheet decreases relatively, to increase the welding current which flows into the crossing part of the bare perforation sheet part of the electrode plate and the rib-formed projection. In this instance, in order to weld simultaneously a large number of crossing parts of the projection 7e and the bare perforation sheet part of electrode plate, the terminal shape of the pair of welding electrodes is preferably in the form of a rectangle, which makes it possible to hold the welding electrode tip approximately along the length direction of the cutout hole 7b and the cutout part 7c.

Further, the projection 7e provided at the edge part of the I-shaped cutout hole 7b crosses also the terminal edge of the spiral coiling start part of electrode plates in the central part of the electrode plate assembly, so that it is welded over nearly the whole length of the diameter direction of the electrode plate assembly. This is very advantageous because electric current can be collected from the entire electrode plate over a wide region including the central part of the spiral coiling of the electrode plate assembly.

This welding technique was applied not only to the positive electrode side current collector 7 but also to the welding of the negative electrode side current collector 8, namely to the welding of the crossing part of the rib-formed projection of the current collector 8 and the bare perforation sheet part 4 of the negative electrode plate.

Figure 7:
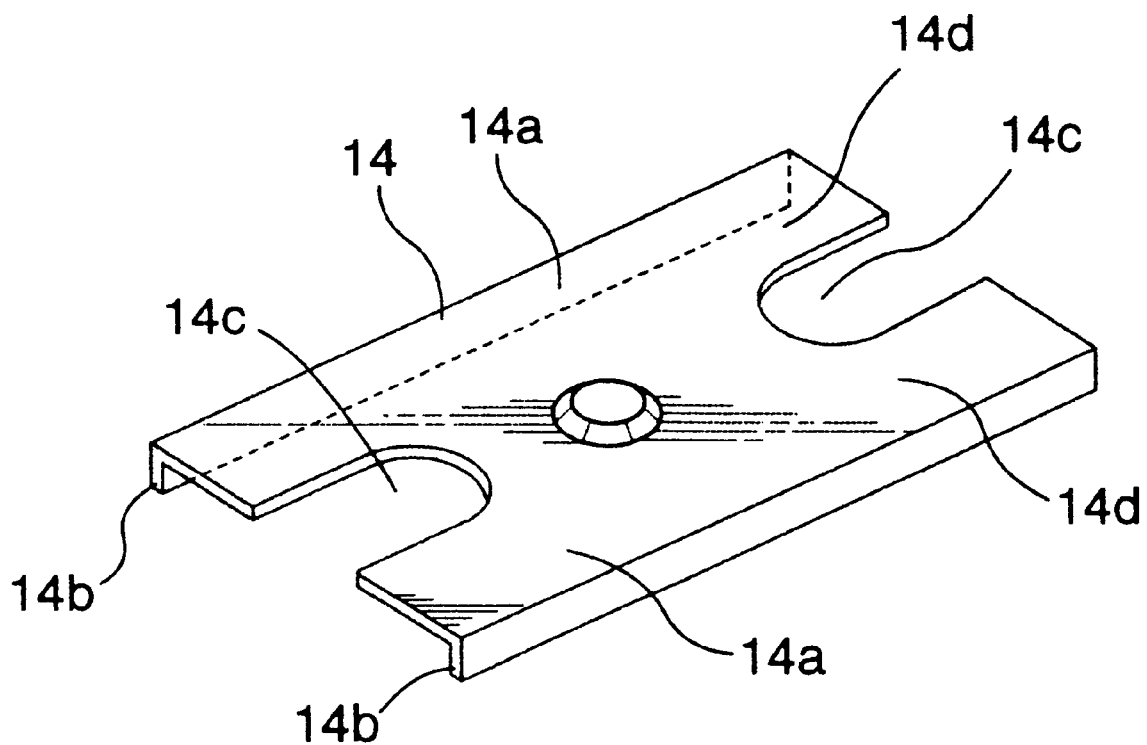
FIG. 7 is a perspective view showing a current collector of the prior art.

For comparison with the battery described above, a battery B of a Comparative Example was prepared with the same structure as described above except that the current collector 14 mentioned earlier was used in place of the current collector 7 welded to the upper part of the electrode plate assembly 5. The current collector 14 is composed, as shown in FIG. 7, of a flat plate part 14a, 0.4 mm in thickness, rib-formed projections 14b of the same thickness formed by bending perpendicularly the both side edges of the plate part 14a, and cutout parts 14c.

The two batteries A and B were respectively charged with an electric current of 5A for 1.5 hours and then discharged with an electric current of 15A (that is, 3C) until the terminal voltage reached 1.0 V. The discharge capacity and the average discharge voltage determined from the test are shown in Table 1.

TABLE 1

| Battery | Discharge capacity | Average discharge voltage |
|---|---|---|
| A | 5000 mAh | 1.18 V |
| B | 4700 mAh | 1.16 V |

As shown in Table 1, the discharge capacity of the battery A was 300 mAh higher than that of the battery B, and the average discharge voltage of the battery A was 0.02 V higher than that of the battery B.

With a view to verifying the difference in performance, the batteries A and B were disassembled and examined. In the battery A, the positive electrode current collector 7 welded to the upper part of the electrode plate assembly was found to be firmly welded because, at all of the crossing parts of the rib-formed projections 7e and the bare perforation sheet parts 3, the projection 7e bit into the perforation sheet part 3 and melted as such; the weld parts also showed a sufficient tensile strength. In the battery B, on the other hand, the positive electrode current collector 14 welded to the upper part of the electrode plate assembly was not sufficiently welded at a plurality of spots among the crossing parts of the projections 14b and the bare perforation sheet parts 3, such insufficiently welded parts are readily peeled apart on stretching, and the weld parts as the whole showed an insufficient tensile strength.

The fact that the battery B has a plurality of parts where the projection 14b and the bare perforation sheet part 3 are not sufficiently melted and welded signifies that the contact resistance of the weld parts of the projections 14b to the bare perforation sheet part 3 as the whole increases; resultantly the battery B has an increased internal resistance and hence showed a lower discharge capacity and lower average discharge voltage than the battery A.

In the battery A, the rib-formed projection 7e of the current collector 7 is provided integrally, bended downward, at the opposed edge parts 7d of the cutout hole 7b and the cutout parts 7c; accordingly, when a pair of welding electrodes are held against the current collector, the welding electric current which flows through the plate part 7a outside of the projection 7e is small and most of the welding electric current concentrates to the projection 7e part, so that at each of the points where the projections 7e cross the bare perforation sheet parts 3 the projection 7e bit into the bare perforation sheet part 3 and melted as it was, resulting in firm welding of the part. Consequently, the battery had a lower internal resistance than the battery B, permitting sufficient discharge with a large electric current; resultantly, the value of electric current which can be charged and discharged with the battery A and its discharge capacity were both high.

Figure 4:
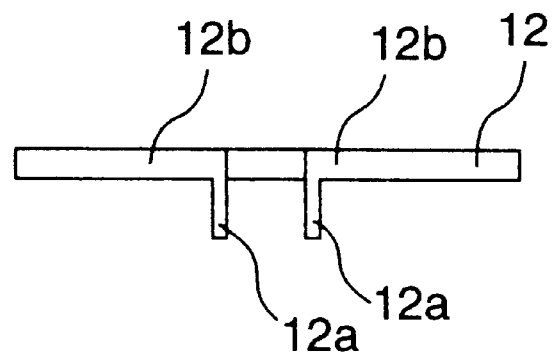
FIG. 4 is a front view of a current collector of another example.

In the above first Example, as shown in FIG. 3, a current collector 7 constructed of a rib-formed projection 7e and a plate part 7a both of the same thickness was used. However, another current collector 12 may also be used wherein, as shown in FIG. 4, the rib-formed projections 12a are bent downward at the edge parts opposed to the cutout parts while being drawn to reduce their sectional area, so as to provide a thickness of the projections 12a smaller than that of the plate part 12b, for example, the thickness of the plate part of 0.4 mm and the thickness of the projections 12a of 0.3 mm. This structure is advantageous in that, in welding the projections 12a to the electrode terminal edge, the welding current more readily flows through the thick plate part 12b and concentrates to the projection 12a, to effect more secure welding.

Figure 5:
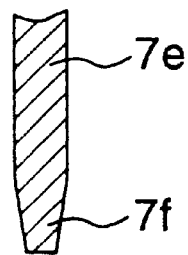
FIG. 5 is a sectional view of the lower end part of the projection of a current collector.

In the above first Example, as shown in FIG. 3, the rib-formed projection 7e of the current collector 7 used was of the same shape over the whole of its height. However, another structure wherein, as shown in the sectional view of FIG. 5, the lower end of the projection 7e is shaved to provide a knife edge-formed sharp part 7f is advantageous in that the sharp part 7f, more easily bites into the bare perforation sheet part of the electrode terminal edge to form point-contact parts, hence heat generation by resistance is much improved, the state of welding becomes more secure and resultantly the welding strength increases.

Figure 6:
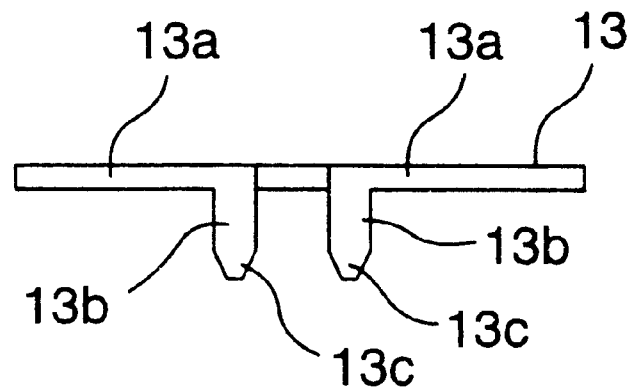
FIG. 6 is a front view of a current collector of still another example.

Further, another current collector 13 wherein the shape viewed from the top is the same as that shown in FIG. 2 but, as shown in FIG. 6, the plate part 13a is subjected to pressing treatment to obtain a thickness smaller than the initial thickness, for example, the thickness is reduced from 0.5 mm to 0.4 mm, the thickness of the projection 13b is selected at 0.5 mm so as to be larger than that of the plate part 13a, and the terminal edge 13c of the projection 13b is sharpened by shaving into the form of a knife edge may also be used. In this case, also, the terminal edge sharpened in the form of a knife edge crosses the bare perforation sheet part and forms point-contact parts to give approximately the same welding effect as in the above Example. Particularly, the increased thickness of the projection 13b increases the area of the electric current take-out part of the current collector and hence increases the limit of passable current, so that the current collector is suited for taking out a large electric current.

Thus, the thickness of the rib-formed projections provided to the current collector is preferably about 0.25–0.5 mm though it depends also on the thickness of the bare perforation sheet to which the projection is to be welded. Considering that the thickness of the perforation sheet used in the electrode plate side is about 0.05–1 mm for reasons described above, the thickness of the projection is 2–8 times the thickness of the perforation sheet. Combinations of the above-mentioned respective dimensions falling in the aforesaid range are preferred to attain good welding, increased sectional area of passage of electricity and increased passable current. The height of the projection, though it depends also on the length (i.e., width) of the projecting part of perforation sheet which the projection crosses and bites into, is preferably about 0.4–0.7 mm when the length of the perforation sheet projecting part is about 0.7–1.8 mm. When the above-mentioned respective dimensions are within the aforesaid ranges, a secure welding can be attained while reducing that part of the electrode plate which does not participate in the electromotive reaction. Moreover, an internal short circuit, which might be caused by the contact of the projection with the terminal edge of the other electrode, can be prevented.

Though a nickel-cadmium storage battery was exemplified in the above first Example, the present invention may also be applied to other alkaline storage batteries, such as nickel-metal hydride storage batteries, so long as they are of cylindrical type.

Thus, according to the present invention, in a cylindrical storage battery having a spirally coiled electrode plate assembly, a current collector welded to the upper part of the electrode plate assembly is provided with a cutout hole which passes the central part of the flat plate thereof and ends inside the plate near its outer peripheral edge and a plurality of cutout parts which extend from the neighborhood of the center of the plate to the outer peripheral edge of the plate without intersecting the cutout hole, rib-formed projections integrally formed downward at the respective edge parts of the cutout hole and the respective cutout parts the respective projections being welded to the terminal edge of the electrode plate at a plurality of spots while crossing the terminal edge and partly biting thereinto. Accordingly, the spirally coiled electrode assembly is strongly welded to the current collector over a wide area extending from the spiral coiling start terminal edge of the the electrode plate of coiling start part to the outer periphery. Thus, a battery which has an excellent current collecting structure and permits high-rate discharge can be provided.

What is claimed is:

1. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, at least the current collector welded to the upper part of the electrode plate assembly being provided with a cutout hole which passes the center of the plate and ends inside the plate near its outer peripheral edge, and a plurality of cutout parts which extend from the area of the center to the outer peripheral edge without intersecting the hole, downward rib-formed projections being respectively formed integrally at the edge parts of the cutout hole and the respective cutout parts, the respective rib-formed projections and the terminal edges of the electrode plates crossing each other and being welded with each other at a plurality of spots while the projections partly bite into the terminal edges of the electrode plate, wherein the downward rib-formed projections are formed in the same thickness as the plate part of the current collector and the terminal edge of the downward rib-formed projections is sharp.

2. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, at least the current collector welded to the upper part of the electrode plate assembly being provided with a cutout hole which passes the center of the plate and ends inside the plate near its outer peripheral edge, and a plurality of cutout parts which extend from the area of the center to the outer peripheral edge without intersecting the hole, downward rib-formed projections being respectively formed integrally at the edge parts of the cutout hole and the respective cutout parts, the respective rib-formed projections and the terminal edges of the electrode plates crossing each other and being welded with each other at a plurality of spots while the projections partly bite into the terminal edges of the electrode plate, wherein the downward rib-formed projections are formed in a thickness smaller than that of the plate part of the current collector and the terminal edge of the downward rib-formed projections is sharp.

3. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, at least the current collector welded to the upper part of the electrode plate assembly being provided with a cutout hole which passes the center of the plate and ends inside the plate near its outer peripheral edge, and a plurality of cutout parts which extend from the area of the center to the outer peripheral edge without intersecting the hole, downward rib-formed projections being respectively formed integrally at the edge parts of the cutout hole and the respective cutout parts, the respective rib-formed projections and the terminal edges of the electrode plates crossing each other and being welded with each other at a plurality of spots while the projections partly bite into the terminal edges of the electrode plate, wherein the rib-formed projections are formed in a thickness larger than that of the plate part of the current collector and the terminal edge of the rib-formed projections is sharp.

4. The cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, at least the current collector welded to the upper part of the electrode plate assembly being provided with a cutout hole which passes the center of the plate and ends inside the plate near its outer peripheral edge, and a plurality of cutout parts which extend from the area of the center to the outer peripheral edge without intersecting the hole, downward rib-formed projections being respectively formed integrally at the edge parts of the cutout hole and the respective cutout parts, the respective rib-formed projections and the terminal edges of the electrode plates crossing each other and being welded with each other at a plurality of spots while the projections partly bite into the terminal edges of the electrode plate, wherein the parts projecting upward and downward of the spirally coiled electrode plate assembly consist essentially of bare parts of respective perforation sheets of the positive and the negative electrode plate, and the rib-formed projection of the current collector welded to the terminal edge of the perforation sheet bare part has a thickness in a range of two to eight times that of the perforation sheet and the projection height of the rib-formed projections from the plate part falls within a range of $1/5$ to $2/3$ of the length of the perforation sheet bare part.

5. A cylindrical storage battery comprising a spirally coiled electrode plate assembly consisting essentially of a positive electrode plate, a negative electrode plate and a separator each in the form of a strip, the terminal edge of one electrode plate projecting upward and the terminal edge of the other electrode plate projecting downward, current collectors each formed essentially of a rectangular or nearly circular plate respectively welded to the respective terminal edges of the respective electrode plates projecting from the upper part or the lower part of the electrode plate assembly, a metal case which houses the electrode plate assembly and the current collectors therein, and a sealing plate provided with a cap-formed terminal at the top which seals the case, at least the current collector welded to the upper part of the electrode plate assembly being provided with a cutout hole which passes the center of the plate and ends inside the plate near its outer peripheral edge, and a plurality of cutout parts which extend from the area of the center to the outer peripheral edge without intersecting the hole, downward rib-formed projections being respectively formed integrally at the edge parts of the cutout hole and the respective cutout parts, the respective rib-formed projections and the terminal edges of the electrode plates crossing each other and being welded with each other at a plurality of spots while the projections partly bite into the terminal edges of the electrode plate, wherein the current collector welded to the terminal edge of one side electrode plate projecting upward of the spirally coiled electrode plate assembly is welded to one end of a lead piece and the other end of the lead piece is welded to the under surface of the sealing plate in at least one spot.

6. A cylindrical storage battery comprising an electrode plate assembly consisting essentially of a strip-shaped positive electrode plate comprising a sintered type nickel substrate and an active material held thereon, a negative electrode plate comprising a strip-shaped perforation sheet and a paste-like electrode material coated on both sides thereof and a strip-shaped separator wound in its entirety in the form of a spirally coiled electrode plate assembly, the positive electrode plate having the perforation sheet of the substrate terminal part projected upward and the negative electrode plate having the perforation sheet of its terminal part projected downward, a positive electrode current collector formed essentially of a rectangular or circular flat plate welded to the perforation sheet projecting part of the positive electrode plate projecting upward of the electrode plate assembly, a negative electrode current collector formed essentially of a rectangular or circular flat plate welded to the perforation sheet projecting part projecting downward, a metal case which houses the above-mentioned members therein and doubles as the output-input terminal of the negative electrode, and a sealing plate provided on the upper side thereof, electrically insulated from the case, with a cap which seals the case and doubles as the input-output terminal of the positive electrode the positive electrode current collector being provided with a cutout hole which passes the central part thereof and ends inside the plate near its outer peripheral edge and a plurality of cutout parts which extend from the neighborhood of the center of the plate to the outer peripheral edge of the plate without intersecting the cutout hole, rib-formed projections integrally formed at the respective edge parts of the cutout hole and the cutout parts being made to cross the perforation sheet projecting part of the positive electrode plate to bite partly into the perforation sheet and welded thereto at a plurality of spots, a lead piece welded at one end to the plate part being welded at the other end to the underside of the sealing plate, the negative electrode current collector being provided with a connecting tongue-shaped lead formed at its central part and at least one cutout hole which extends from the area of the connecting tongue-shaped lead and ends in the area of its outer peripheral edge, and a plurality of cutout parts which extend from the area of the central part to its outer peripheral edge without intersecting the connecting tongue-shaped lead and the hole, rib-formed projections respectively formed integrally at the respective edge parts of the cutout hole and the cutout parts being made to cross the perforation sheet bare part of the negative electrode plate to bite partly into the perforation sheet and welded thereto at a plurality of spots, the connecting tongue-shaped lead being welded to the inner bottom of the battery case.

7. The cylindrical storage battery according to claim 6 wherein the length of the perforation sheet projecting parts formed in the positive and the negative electrode plate is about 0.7–1.8 mm, and the height of the rib-formed projections provided integrally at the respective cutout holes and cutout parts of the positive electrode current collector and the negative electrode current collector is about 0.4–0.7 mm.

8. The cylindrical storage battery according to claim 6 wherein the positive electrode current collector and the negative electrode current collector are both formed essentially of a nickel-plated iron flat plate and the lead piece welded at one end to the positive electrode side current collector is formed essentially of a nickel plate.

* * * * *